UNITED STATES PATENT OFFICE.

EDMOND GARNIER, OF LONDON, ENGLAND, ASSIGNOR OF THREE-FOURTHS TO ANTHONY RAYMOND, OF SAME PLACE.

MANUFACTURE OF RUBBER OR OTHER GUMS.

SPECIFICATION forming part of Letters Patent No. 621,060, dated March 14, 1899.

Application filed October 22, 1898. Serial No. 694,297. (No specimens.)

*To all whom it may concern:*

Be it known that I, EDMOND GARNIER, a subject of the Queen of England, residing at London, England, have invented certain new and useful Improvements in the Manufacture of Rubber or other Similar Gums, (for which I have made application for Letters Patent in Great Britain, No. 7,636, dated March 30, 1898,) of which the following is a specification.

This invention relates to the manufacture of rubber or other similar gums, and has for its object to dispense with vulcanization, and consequently the use of sulfur, and to obtain a product which can be colored as desired, while possessing the same properties as ordinary vulcanized rubber.

According to this invention the rubber or other gum has the powders usually employed in such manufacture thoroughly incorporated with it. After a thorough amalgamation of these substances has taken place there is added a certain quantity of a substance which is obtained by the following special treatment of alum: Alum is dried in some convenient way, such as by placing it upon heated iron plates, and when entirely freed from moisture it is treated with a solution of terebinth or benzene and shellac or ambergris, resin, or other similar gum. The mixture is evaporated to dryness, and the substance thus obtained is dried and then incorporated with the mixture of rubber and other powders, the whole being rolled out and otherwise treated according to the purpose for which the product is intended to be used.

Any desired coloring-matter may be introduced into the above-described mixture, the required shade being retained in the finished product, since the specially-treated alum does not act deleteriously on the coloring-matter, as is the case with the sulfur in the ordinary vulcanization process.

It is to be understood that though sulfur may incidentally be present in the mixture it is not specially introduced, as when the substance is intended to undergo vulcanization. Moreover, the present mixture is never raised to a heat at all approaching that at which vulcanization sets in, the treated alum having the desired "setting" effect upon the rubber at a comparatively low temperature.

The following is an example of one way in which the improved manufacture of rubber may be carried out: Alum is taken—say eight ounces—and after it has been thoroughly dried a solution of benzol and a gum, such as tragacanth, is poured upon it, the solution being composed of, say, one part of gum in twenty parts of benzol. The product is evaporated to dryness. The powders usually employed in the manufacture of rubber are mixed well together. These powders may be in the proportion of three pounds of ground whiting, one pound of barytes, and eight ounces of lime. To these powders is added, say, one pound eight ounces of oxidized oil, a certain quantity of rubber—say eight ounces—and also preferably about eight ounces of redeemed gutta. When these ingredients have been thoroughly mixed together, the specially-treated alum is incorporated with them, the whole compound being passed through mixing-rollers in the cold. Finally, the necessary quantity of colorant, if the product is to be colored, is added. This may be in the proportion of about two pounds for the above-mentioned quantities. The substance is now passed through the calendering-rolls.

I claim—

1. In the manufacture of rubber, the method substantially as hereinbefore described of dispensing with the usual vulcanization, which consists in incorporating with rubber a preparation of alum.

2. In the manufacture of rubber, the method substantially as hereinbefore described of dispensing with the usual vulcanization, which consists in incorporating with rubber, alum treated with a spirituous solution of a gum.

3. In the manufacture of rubber, the method substantially as hereinbefore described of dispensing with the usual vulcanization, which consists in incorporating with rubber, alum treated with a solution of gum-tragacanth in benzol.

4. In the manufacture of rubber, the method substantially as hereinbefore described, of dispensing with the usual vulcanization, which consists in incorporating with rubber, alum treated with a solution of gum in a spirit, oxidized oil, gutta and a colorant.

5. In the manufacture of rubber, the method substantially as hereinbefore described, of dispensing with the usual vulcanization, which consists in incorporating with a mixture of rubber and the usual powders employed therewith, alum treated with a spirituous solution of a gum, oxidized oil, gutta, a colorant and rubber.

In testimony whereof I hereto set my hand in the presence of the two subscribing witnesses.

EDMOND GARNIER.

Witnesses:
RICHARD G. WELLS,
W. M. HARRIS.